Feb. 1, 1966 W. Z. COVINGTON 3,231,907
COMB SUPPORT FRAME FOR BEEHIVES
Filed July 20, 1964 2 Sheets-Sheet 2
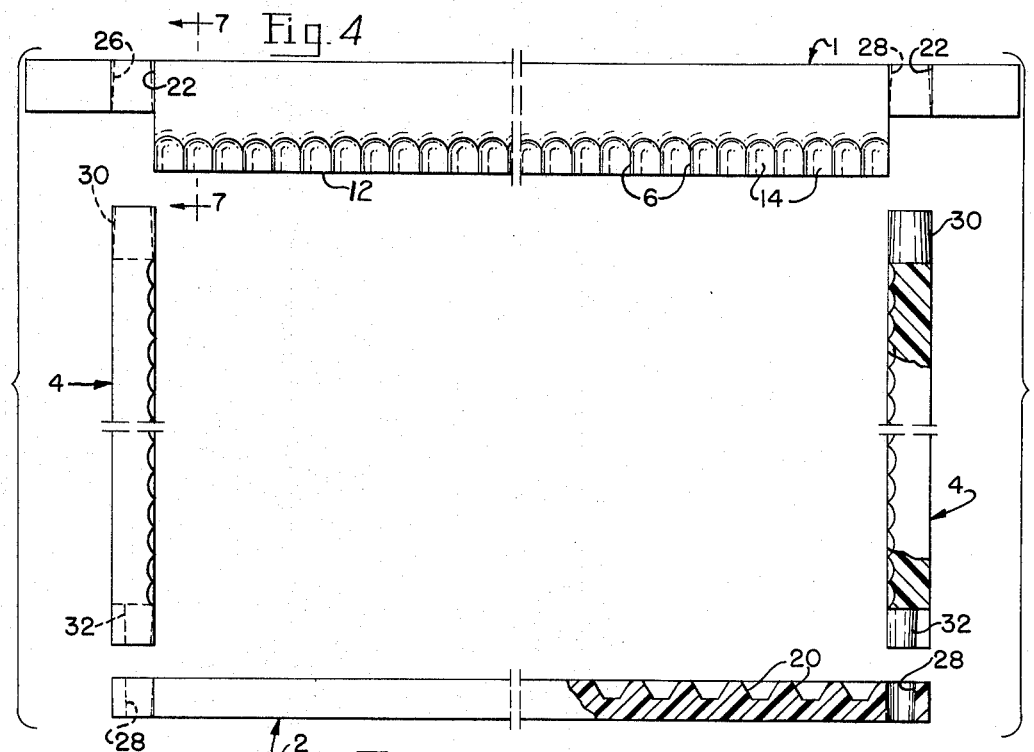
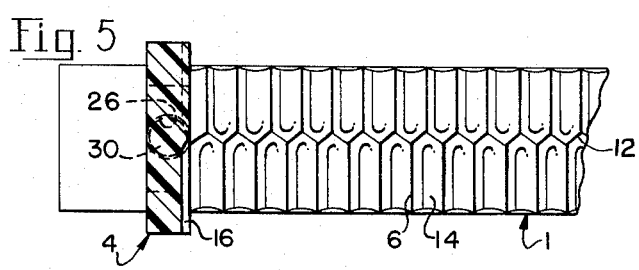
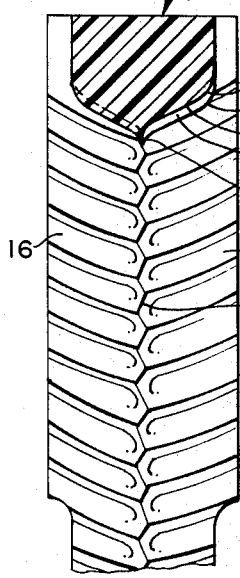
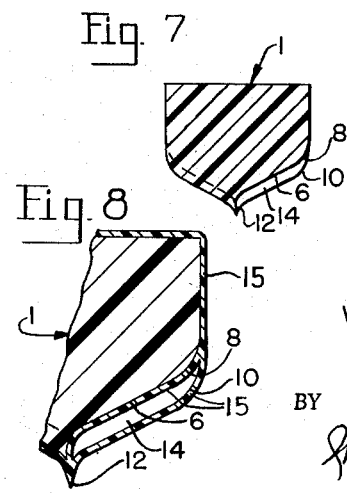
WILLIAM Z. COVINGTON
INVENTOR.
BY Wayland D. Keith
HIS AGENT

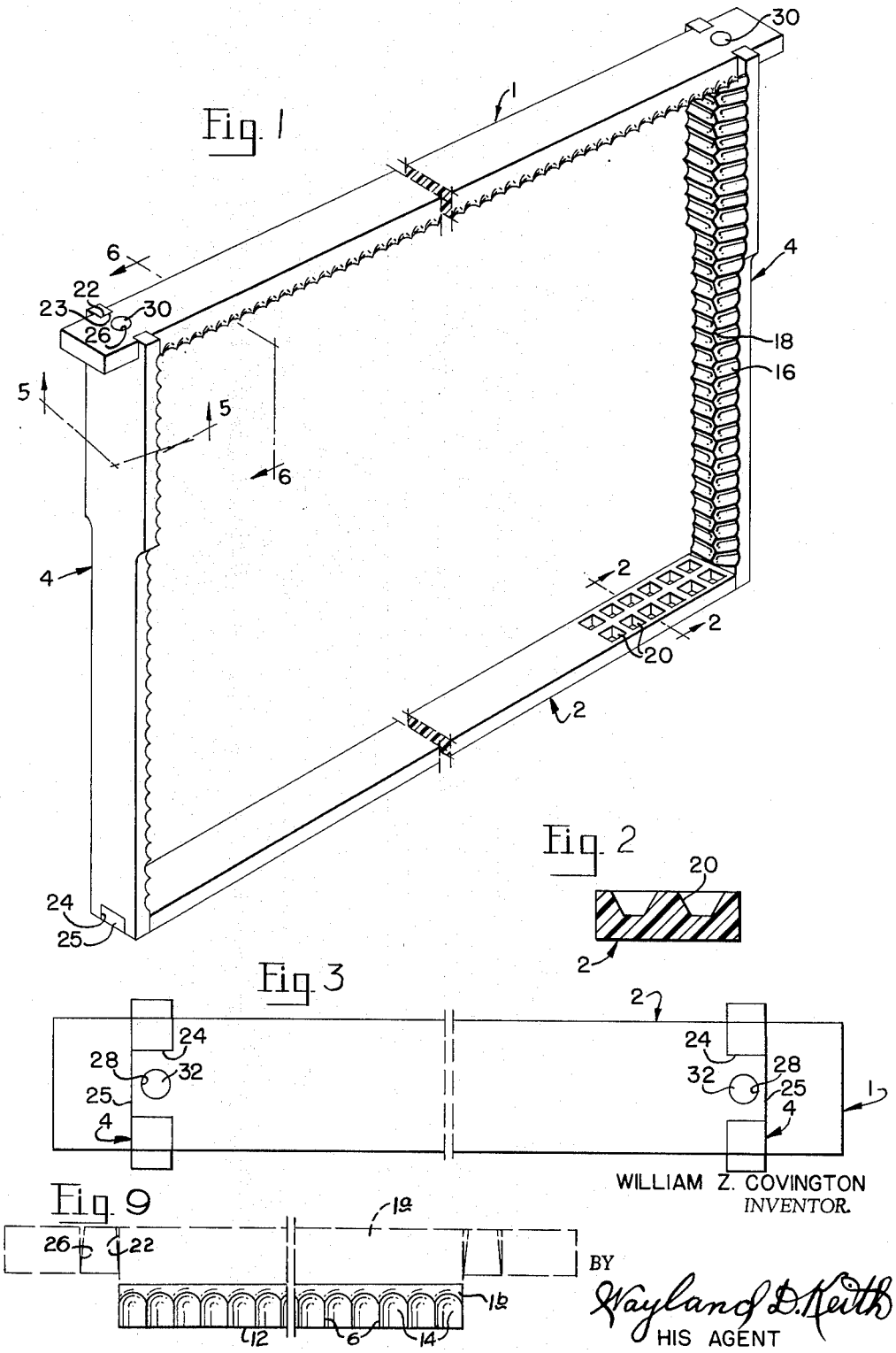

United States Patent Office 3,231,907
Patented Feb. 1, 1966

3,231,907
COMB SUPPORT FRAME FOR BEEHIVES
William Z. Covington, Rte. 3, Box 247C,
Wichita Falls, Tex.
Filed July 20, 1964, Ser. No. 383,800
12 Claims. (Cl. 6—10)

This invention relates to improvements in comb frames for the supers or brood compartments of beehives, which frame may be supplied in its entirety, or the guide portion thereof provided as an adjunct for existing frames.

Bees, if left to their own devices, may not align the comb in the frame, thereby causing difficulty and creating waste in recovering honey from the hive.

Heretofore, many beekeepers have provided comb foundation in comb frames, which was tedious to insert and to remove, when honey filled comb was built thereon, also comb foundation added to the expense of producing honey on a commercial scale.

The present comb frame, having an especially formed starter ridge thereon, is inexpensive, easy to use, and is effective in guiding the formation of honey comb, by the bees, within the confines of the comb frame, so it can be quickly and easily removed, without the waste of honey in the process.

The present comb frame has, as one of the components thereof, an upper frame portion, which is an elongated strip molded of plastic, or plastic with a wood or fibre filler, or wood and a binder, or it may be formed from pressed natural wood, to form the various contours and shapes as set out herein. The inner face of the elongated top or upper portion extends downwardly and inwardly, and the apex thus formed is a starter ridge, from which the formation of the comb cells takes place. The downwardly and inwardly sloping inner surfaces of said upper frame are grooved from the center outward and upward to the exterior dimension, with these rows of grooves being off-set one-half the width of a comb cell, with respect to each other, which rows of cells are complementally arranged on the respective sloping surfaces. The starter ridge, the sloping grooved surfaces of the upper frame portion of the comb frame are either made of a material which is acceptable to the bees or are coated with a material which is acceptable to the bees, preferably beeswax, and with the top portion thus formed, it will serve as a starter and guide for the bees in forming the comb cells within the confines of the comb frame, thereby obviating the necessity for the use of comb foundation and facilitating the removal of the frame from the hive. Since many frames may be used within a single hive body or super, time and expense are saved, and convenience is had in removing the honey from the frame.

Recesses may be formed in the inner face of the bottom frame section to receive bee food, at such times as it is necessary to provide supplemental feeding for the bees.

There are many materials which are inexpensive, and which are easy to mold and handle, such as plastics, but which may be rejected by the bees. It is therefore, expedient, when using polyethylene, styrene, or the like to coat such material with beeswax, or to add wood flour and a binder to the molded plastic prior to the molding or pressing of the components of the comb frame. Natural wood, in strips, may be processed by methods well known in the art of wood working, to press particellular indentations in at least the top or starter strip of the comb frame and preferably in the sides of the frame, so as to encourage bees to form comb cells therealong, of the general character and size of the particellular indentations.

The present comb frame is molded in knock-down sections for shipment or storage, and which components are so designed as to be readily assembled in a minimum of time and with a minimum of tools to form a rigid comb frame, in which the bees can build honey comb cells.

An object of this invention is to provide a knock-down comb frame for use in beehives, the components of which are readily assembled, and which require no auxiliary fastening elements, and at least the top portion of which has parti-cellular grooves or indentations formed therein.

Another object of the invention is to provide comb frame components from which a comb frame, having parti-cellular indentations or grooves therein, can be formed, which indentations are of a size and shape to induce bees to start comb cell structure thereon, which comb cell formation will be guided by the comb frame.

Yet another object of the invention is to provide components for comb frames for beehives, which may be readily assembled, wherein a plastic and a filler are used to form rigid components, having particellular grooves which are so formed as to induce bees to form comb cell structure thereon.

A further object of the invention is to provide components from which to form comb frames for beehives which can be assembled by two blows from an impact tool, such as a hammer, and which require no auxiliary fastening elements.

Still another object of the invention is to provide a comb frame or a portion thereof, which is made of a material or is coated with a material which is acceptable to bees.

Yet a further object of the invention is to provide a starter ridge and simulated, parti-cell structure for a comb frame, which may be made integral with the comb frame or which may be added to an existing frame to produce a frame and guide within the scope of the present invention.

With these objects in mind and others which will become manifest as the description proceeds, reference is to be had to the accompanying drawings in which like reference characters designate like parts in the several views thereof, in which:

FIG. 1 is a perspective view of a comb frame for a beehive, with parts thereof being broken away and shortened, showing the parti-cellular indentations on the inner top frame portion and on the inner surfaces of the end frame portions;

FIG. 2 is a sectional view taken on the line 2—2 of FIG. 1, looking in the direction indicated by the arrows;

FIG. 3 is a bottom plan view of the frame shown in FIG. 1, with parts thereof being broken away and shortened to bring out the details of construction;

FIG. 4 is a side elevational view of the components of the comb frame, but in exploded relation, with parts broken away and shortened, and with parts shown in section to bring out the details of construction;

FIG. 5 is a sectional view taken on the line 5—5 of FIG. 1, looking in the direction indicated by the arrows, with parts being broken away;

FIG. 6 is a sectional view taken on the line 6—6 of FIG. 1, looking in the direction indicated by the arrows;

FIG. 7 is a sectional view taken on the line 7—7 of FIG. 4, looking in the direction indicated by the arrows;

FIG. 8 is an enlarged fragmentary, sectional view, similar to FIG. 7, but with a wax coating being shown thereon; and FIG. 9 is a side elevational view of the upper frame portion only, with the support portion thereof being shown in dashed outline, and showing an attachable strip thereon in full outline, which strip has parti-cellular grooves formed therein and extending downwardly into an apex, for attachment to the support member.

With more detailed reference to the drawing, the numeral 1 designates generally the upper portion of the comb frame, the ends of which extend outward from the frame proper to support the frame in a beehive. The numeral 2 designates the bottom portion of the frame, with each end portion being designated at 4. These frame components, when assembled, are of a dimension which makes the comb frame interchangeable with or usable with conventional frames.

It is preferable to mold the frame components of the present comb frame of plastic or of plastic with a filler and a binder, which components are molded under heat and pressure to produce components sufficiently strong to withstand the normal handling use to which they are subjected.

The upper frame portion 1, as will best be seen in FIGS. 6 and 7, has the lower surface thereof sloping downwardly and inwardly, as indicated at 6. The outer corners of the upper frame portion are rounded, as indicated at 8 and 10. The downwardly and inwardly sloping portions 6 form an apex or starter ridge 12 to extend the interior length of the upper frame portion. The sloping surfaces of the inner top frame portion 1 are each grooved throughout the length thereof to form parti-cell, contoured grooves 14, the parti-cellular grooves of one sloping surface being off-set one-half the width of a comb cell, with respect to the grooves of the other sloping surface. The grooves are of a size and contour to simulate a portion of a comb cell, thereby to induce the bees to start building comb cells thereon to extend therefrom, which comb cell structure is built within the confines of the comb frame.

The end portions 4 are each likewise grooved or contoured on the iner surface thereof, as indicated at 16. Each row of grooves extends from the exterior long dimension of each end frame portion toward the center, as indicated at 18, with the rows of grooves being off-set one-half the width of a comb cell, with respect to each other, the grooves being of a size and contour of the grooves on the inner sloping surfaces 6 of the upper frame portion 1.

It will be seen that the comb cells built within this frame will slope downwardly and inwardly, therefore, honey deposited therein will flow to the bottom and be retained therein until capped. At least the inner surface of each frame component and the starter ridge are coated with a material which is acceptable to the bees, preferably beeswax. Which coating needs to be removed and replaced only if disease infests the hive and the frame needs to be sterilized.

The inner surface of the bottom frame portion 2 has recesses 20 formed therein, as shown in FIG. 1, which recesses may be stocked with bee food, at such times as supplementary feeding is necessary.

While, because of mass production, it is necessary to have these frame portions molded of plastic, or of plastic combined with a filler, such as wood flour, which, with or without a coating of beeswax or the like, would be acceptable to the bees. If made of wood, the contours and indentures can be pressed thereinto by steam and pressure, as is well known in the art of wood processing, which will give the same parti-cellular contours as in the molded product.

The frame components may be made with notches 22 and 24 therein, and with holes 26 and 28 therein to receive complementary tapered pins 30 and 32 in a wedging manner. Therefore, when the frame portions are assembled, the component parts will not require auxiliary fastening elements, such as nails to hold the parts in assembled relation.

The tolerance of fitting is such that, when the components 1, 2 and 4 are positioned as shown in FIG. 4, the notches 22, in the upper frame portion and notch 23 in each end of said frame portions 4 will interfit in wedging relation. The lower end of each end frame member has a notch 24 therein to receive a tongue 25 formed on each end of the bottom frame portion in wedging engagement. The end members 4 each have an upwardly extending tapered pin or dowel 3, and a downwardly extending tapered pin or dowel 32, mediate the width of the respective notches 23 and 24, which pins or dowels are complementally received in the respective tapered holes 26 and 28 in wedging relation. Thus the components of the comb frame can be assembled into a rigid rectangular frame, by light blows by an impact hammer or the like on the top of each end of the upper frame portion, with the bottom frame portion in complementally aligned relation with the respective pins. In this maner, one light blow on each end of the top of the upper frame portion will assemble the frame components, quickly and efficiently, into a rigid, rectangular frame ready for use.

*Modification of invention*

A modified form of the invention is shown in FIG. 9, which is similar to that shown in FIGS. 1 through 8, however, the form of the invention shown in FIG. 9, utilizes an upper frame support strip 1a onto which a lower portion 1b is secured, as by nails, cement or the like. The upper frame portion 1a is of the general character, as used with comb foundation, and has a lower flat face to which the lower portion 1b, in which parti-cellular grooves 14, of the same character as shown in FIGS. 1, 4, 7 and 8, are formed.

When it is desired, the upper portion of conventional comb frames can be converted into a comb starter frame portion such as shown at 1, merely by adding the portion 1b to the lower side thereof, as by nails, cement or the like. The lower portion 1b is formed, in all respects, the same as the above mentioned upper frame portion 1, and may be made of any material from which the upper frame portion 1 is made, and it may also be treated with beeswax or other material to make it acceptable to the bees.

When the portions 1a and 1b are secured together they form an upper frame portion which may be used with conventional comb frames, or they may be used with end portions as shown in FIGS. 1, 4 and 6.

By having the portion 1b formed of an elongated strip, with a plane upper surface, they may be sold individually for attachment to conventional frames, such as indicated at 1a, thereby saving the beekeeper the expense of new frames, but which would still give the advantages of the starter ridge 12 and parti-cellular grooves 14.

Having thus clearly shown and described the invention, what is claimed as new and desired to be secured by Letters Patent is:

1. A comb supporting and guide frame for use in a beehive, which comb supporting and guide frame comprises;

(a) an elongated upper support portion, having downwardly and inwardly sloping portions on the lower side thereof, forming the top of said frame, (1) said upper support portion having side by side grooves formed in the respective downwardly and inwardly sloping portions thereof, with the grooves on one of the downwardly and inwardly sloping portions being off-set, substantially one-half the width of one groove, with respect to the grooves of the other of the downwardly and inwardly sloping portions, (2) the adjacent terminal ends of the respective series of grooves forming a starter ridge, (b) end frame portions, each said frame portion having an inner surface, the upper end of each end frame portion being secured in rigid relation with the respective ends of said elongated upper support portion so that each end frame portion will form substantially a right angle with said upper support portion, and (c) an elongated bottom frame portion secured to the respective lower ends of said end frame portions in fixed relation so as to form substantially a right angle with said respective end frame portions.

2. A comb supporting frame and guide for use in a beehive as defined in claim 1; wherein (a) said elongated upper support portion, said end frame portions and said elongated bottom portion are formed of molded plastic material.

3. A comb supporting and guide frame for use in a beehive as defined in claim 2; wherein (a) said plastic material has a coating, on at least the inner adjacent faces thereof, of a material conductive to bees building cellular comb thereon.

4. A comb supporting and guide frame for use in a beehive, as defined in claim 2; wherein (a) at least the inner adjacent surfaces of said upper elongated support portion, said end frame portions, and said elongated bottom frame portion are coated with a material, at least a part of which is beeswax.

5. A comb supporting and guide frame for use in a beehive, as defined in claim 2; wherein (a) each end frame portion having side by side grooves formed therein on the respective inner surfaces thereof, which grooves extend substantially to the center thereof, with adjacent terminal ends of the grooves being off-set by approximately one-half the width of one groove, with respect to the adjacent grooves which extend inwardly from the other side thereof, (1) an outstanding ridge formed by the adjacent terminal ends of the respective series of grooves, (b) said elongated upper support portion, said end frame portions, and said elongated bottom portion are each coated, on at least the inner adjacent faces thereof, with beeswax.

6. A comb supporting and guide frame for use in beehives, as defined in claim 1; wherein (a) each end frame portion having side by side grooves formed therein on the respective inner surfaces thereof, which grooves extend substantially to the center thereof, with adjacent terminal ends of the grooves being off-set by approximately one-half the width of one groove, with respect to the adjacent grooves which extend inwardly from the other side thereof, (1) an outstanding ridge formed by the adjacent terminal ends of the respective series of grooves, (2) said grooves in said end frame portions slope downwardly and inwardly toward the center of the respective side frame portions, with the grooves of each series of grooves being parallel.

7. A comb supporting and guide frame for use in beehives, which comb supporting and guide frame comprises;

(a) an elongated upper support portion forming the top of said frame, (1) a notch formed in each end of said elongated upper support portion, (2) said elongated upper support portion having a downwardly and inwardly sloping portion on the lower side thereof, (3) said upper support portion having grooves formed in side by side relation on one side of said downwardly and inwardly sloping portion thereof, which grooves terminate along a medial line on the apex of said downwardly and inwardly sloping portion, (4) the opposite side of said downwardly and inwardly sloping portion of said upper support portion having grooves formed therein in side by side relation, which grooves are off-set with respect to said first mentioned grooves substantially one-half the width of one of said grooves, the lower ends of said grooves terminating adjacent the terminal ends of said first mentioned grooves and forming a starter ridge, (b) end frame portions, each having the upper and lower ends thereof notched, the notches in the respective upper ends being interfitted with the respective notches of said elongated support portion, so the respective end frame portions will form substantially right angles with said elongated upper support portion, (1) each said side frame portion having side by side grooves formed therein on the inner faces thereof, which extend substantially to the center thereof, with grooves formed in side by side relation on the other portion of said side frame portions, which grooves are laterally off-set with respect to the grooves formed on the other half of said respective said frame portions approximately one-half the width of one groove, with respect to the grooves extending inwardly from the other side thereof, (2) the adjacent terminal ends of the respective series of grooves forming a starter ridge, (3) an elongated bottom frame portion having a tongue on each end thereof, said respective tongues being complementally engagable with the notches of the respective side frame portions so as to form substantially a right angle with the respective side frame portions.

8. A comb supporting and guide frame for use in beehives, as defined in claim 7; wherein (a) said elongated bottom frame portion has a multiplicity of recesses formed in the inner face thereof to receive bee food.

9. A comb supporting and guide frame for use in beehives, as defined in claim 7; wherein (a) each said end frame portion has at least one pin extending outward therefrom within at least one notched portion thereof, (b) one of said elongated portions having a hole formed transversely therethrough to complementally receive said pin in tight fitting relation.

10. A comb supporting and guide frame for use in beehives, as defined in claim 7; wherein (a) an outstanding pin formed on each end frame member within said respective notches, (b) said elongated upper support portion and said elongated bottom portion each having holes formed therein near the ends thereof to complementally receive said respective pins in wedging engagement.

11. A guide and starter portion for attachment to an elongated upper support portion of a comb frame for a beehive, which guide and starter portion comprises;

(a) an attachable, elongated strip having a plane upper face, (b) the lower face of said elongated strip sloping downwardly and inwardly from each side to a medial longitudinal apex, which apex forms a comb starter ridge, (1) each said sloping lower face having side-by-side grooves formed therein, the grooves of one sloping face being off-set one-half the width of one groove, with respect to the grooves of the other sloping face, and (c) means attachably securing said plane upper face of said elongated strip to the lower face of the upper support portion of a comb frame.

12. A guide and starter portion for attachment to an elongated upper support portion of a comb frame for a beehive, which guide and starter portion comprises;
  (a) an attachable, elongated strip having an upper face,
  (b) the lower face of said elongated strip sloping downwardly and inwardly from each side to a medial longitudinal apex, which apex forms a comb starter ridge,
    (1) each said sloping lower face having side-by-side grooves formed therein, the grooves of one sloping face being off-set one-half the width of one groove, with respect to the grooves of the other sloping face, and
  (c) means attachably securing said upper face of said elongated strip to the lower face of the upper support portion of a comb frame.

References Cited by the Examiner
UNITED STATES PATENTS
2,023,959  12/1935  Knox _____ 6—10

FOREIGN PATENTS
895,993  11/1953  Germany.

SAMUEL KOREN, *Primary Examiner.*
LUCIE H. LAUDENSLAGER, *Examiner.*